July 26, 1932. W. H. SIEVERS 1,868,853
FLOWERPOT HOLDER
Filed July 20, 1931 2 Sheets-Sheet 1

Inventor
William H. Sievers
By Popp & Powers
Attorneys

July 26, 1932.  W. H. SIEVERS  1,868,853
FLOWERPOT HOLDER
Filed July 20, 1931  2 Sheets-Sheet 2
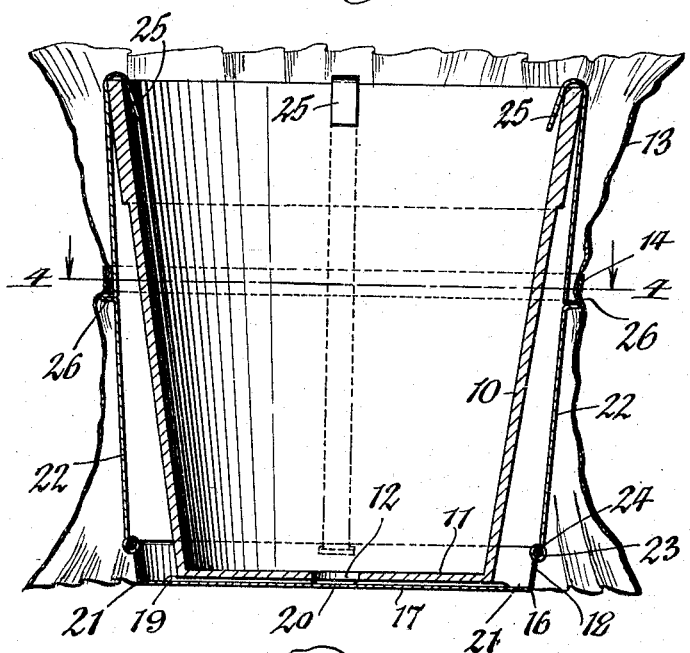
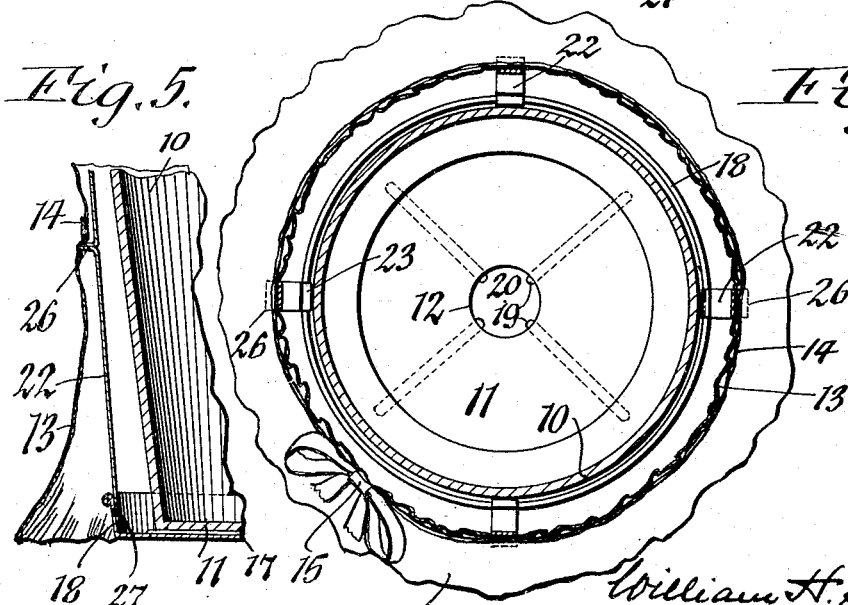

Patented July 26, 1932

1,868,853

UNITED STATES PATENT OFFICE

WILLIAM H. SIEVERS, OF BUFFALO, NEW YORK

FLOWERPOT HOLDER

Application filed July 20, 1931. Serial No. 551,873.

This invention relates to a flower pot holder, and more particularly to a holder of this character which is adapted to couple the pot with a water drip pan which receives the pot and also supports a decorative jacket around the exterior of the pot and the holder, the several members being so organized that when assembled the same form a connected unit which can be readily handled and wrapped preparatory to being set to a customer without liability of any of the parts becoming disarranged.

It is the purpose of this invention to provide such a flower pot holder which is very simple and inexpensive in construction, which is capable of being easily attached to a flower pot and support an enclosing ornamental jacket, and which can be conveniently and compactly folded for storage and transportation.

In the accompanying drawings:

Figure 3 is a vertical section of the combined flower pot, holder and jacket shown in Fig. 1.

Figure 4 is a horizontal section taken on line 4—4 Fig. 3.

Figure 5 is a fragmentary vertical section showing a modified form of my invention.

In the following description similar characters of reference indicate like parts in the several figures of the drawings.

Figure 1:
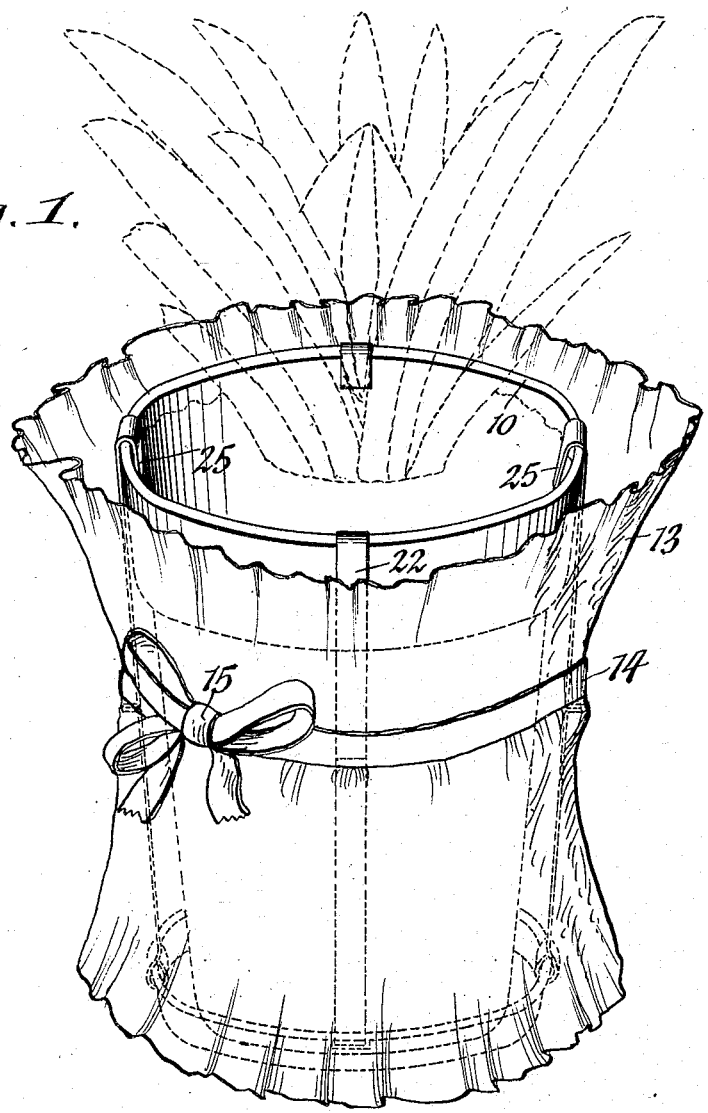
Figure 1 is a perspective view of a flower pot and a jacket equipped with a holder embodying my invention.

The flower pot which is adapted to contain the earth and a plant placed in the earth may be of the usual and well-known form and comprises an upwardly flaring side wall or body 10 which is open at the top, and a flat bottom 11 arranged at the lower end of the body 10 and provided with a central opening 12 through which the excess moisture supplied to the earth and plant may escape.

My improved holder is so organized that the same not only catches the water dripping through the bottom of the flower pot but also forms a support for the jacket or cover 13 of paper or similar material which is usually placed around the periphery of the flower pot and attached thereto by means of a ribbon or band 14 which is placed around the outer side of this jacket or cover and has its ends tied together in the form of a bow 15 so as to hold the jacket in place.

The holder forming the subject of this invention is interposed between the flower pot and the cover and is adapted to form a unit therewith which can be readily handled for wrapping the same up in paper preparatory to sending the same to a customer without liability of the parts becoming disarranged during this operation.

Figure 2:
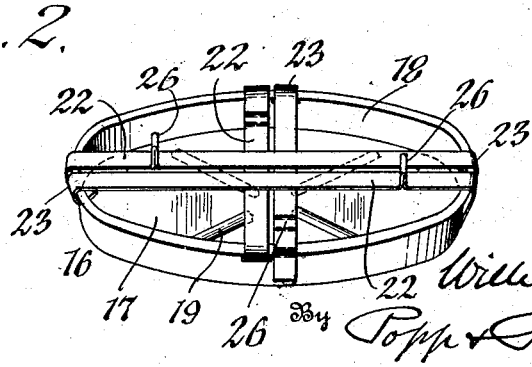
Figure 2 is a similar view of the holder in its folded condition suitable for storing or shipping compactly.

This holder may be varied in the details of its form but as shown in the drawings the same is preferably constructed as follows:

Referring to Figs. 1, 2, 3 and 4, the numeral 16 represents a drip pan in which the lower end of the flower pot is placed, this pan being preferably constructed of sheet metal so as to form a horizontal bottom 17 and an annular rim or flange 18 projecting upwardly from the margin of the pan bottom. The bottom of the pan is provided with a plurality of spacing ribs 19 which are preferably arranged radially and terminate at their inner ends short of the area 20 on the central part of the pan bottom, as shown in Figs. 2, 3 and 4, and also terminating short of the flange or rim of the pan, as shown at 21, thereby permitting the water to escape freely from the lower end of the opening in the flower pot which rests on the ribs of the drip pan, and also permitting the water to distribute itself freely over the entire surface of the pan bottom and thereby avoid the possibility of greater depth of water being in one part of this pan than in another, and possibly affecting the uniform escape of water from the flower pot into the pan.

The diameter of the drip pan is somewhat greater than the diameter of the lower end of the flower pot so as to form an intervening annular channel between the lower end of the pot and the rim of the pan when the parts are assembled, thereby avoiding free evaporation of the water which accumulates in the pan.

Means are provided for detachably connecting this pan to the flower pot so that the pan and pot will be connected and enable the same to be readily handled for various purposes.

In the preferred construction of these attaching means the same comprise a plurality of attaching arms 22 which are preferably four in number and distributed equidistant around the pan and the pot. Each of these attaching arms is preferably constructed of a strip of bendable sheet metal, the inner or lower end of which is pivotally connected with the pan by providing this end with an eye 23 which receives a pivot or pintle 24 formed on the upper edge of the pan rim 18 so that this arm can be swung either into an upright position for use, as shown in Figs. 1 and 3, or into a horizontal position over the top of the pan, as shown in Fig. 2 for compactly folding the parts of the holder for storage and shipping purposes.

After the flower pot has been placed with its lower end on the bottom of the drip pan these members are connected with each other so as to be movable in unison by raising the several attaching arms into an upright position and bending the upper end of each of these arms inwardly and downwardly over the adjacent upper edge portion of the flower pot so as to form a hook 25, as shown in Figs. 1 and 2, and thereby maintain the pan and pot in an assembled condition which permits the same to be carried about and handled without liability of the parts becoming detached.

Owing to the flexibility of the attaching arms the upper ends of the same can be readily bent over the upper edges of pots varying more or less in height, thereby avoiding the necessity of any particular care in manufacturing the attaching arms of an exact length, as well as avoiding the necessity of making this holder of an unduly large number of sizes to fit different sizes of flower pots.

This holder when secured to the pot also forms a support for the decorative jacket or ornamental cover which surrounds the holder and pot.

In order to maintain this cover or jacket reliably in the proper position around the holder and pot, the attaching arms of the holder are provided about midway between their upper and lower ends with laterally extending projections 26, each of which is preferably formed by doubling or folding a part of the metal of this arm, and thus produces an upwardly facing shoulder on each of these arms.

In applying the jacket or cover to the holder and pot, that part of the jacket immediately above the shoulders 26 is drawn inwardly relative to these shoulders by the tie band 14 so that the diameter of this jacket about midway of its height is somewhat less than the upper and lower ends thereof, and an internal downwardly facing shoulder is formed on the jacket which rests on the upwardly facing shoulders of the attaching arms, as shown in Fig. 3, thereby preventing the jacket from slipping down on the attaching arms and instead maintaining the jacket definitely in its proper position relative to the jacket and pot.

As a general rule the lower end of the jacket is spread out or flared downwardly so as to rest on the table or other support which carries the drip pan, and the upper end of the jacket is likewise flared upwardly relative to the holder and pot, and thereby adds to the attractiveness of the plant which is being displayed.

A flower pot assembled with a holder of this character and surrounded by a decorative jacket or cover of the character described can be readily wrapped up in a sheet of paper and form a package which can be easily transported and set to a customer or elsewhere without liability of any of the parts becoming disarranged. Upon reaching its destination this flower pot with the holder attached thereto may be set up immediately in the place where it is to be used for decorative purposes by placing the drip pan on the table or other support provided for the same and thus avoid the necessity of using saucers, plates or the like for preventing any water escaping through the hole in the bottom of the flower pot from injuring the furniture.

Owing to the simplicity in the construction of this holder the same can be used generally by the floral trade and without incurring any undue expense.

Instead of pivotally connecting each of the attaching arms to the drip pan, as shown in Figs. 1–4, the connection between the lower end of each attaching arm may be effected by spot-welding the arm to the rim of the pan, as shown at 27 in Fig. 5. In this last-mentioned construction the attaching arms may be moved into either an upright position for use or into a horizontal position for storage purposes by simply bending the metal of the attaching arm at its lower end and thereby accomplishing the same purpose which is possible by the use of the hinge joint between the attaching arms and the drip pan, shown in Figs. 2–4.

I claim as my invention:

1. A flower pot holder comprising a drip pan in which the lower end of the pot is adapted to rest, and a plurality of attaching arms connected at their lower ends with said pan and adapted to be bent at their upper ends over the upper edge of said pot and provided between their lower and upper ends with laterally projecting shoulders for preventing downward movement of a tie band applied above said shoulders to the exterior of a jacket surrounding said holder and pot.

2. A flower pot holder comprising a drip pan in which the lower end of the pot is adapted to rest, a plurality of attaching arms connected at their lower ends with said pan and adapted to be bent at their upper ends over the upper edge of said pot and provided between their lower and upper ends with laterally projecting shoulders, a jacket surrounding said holder and pot, and a tie band applied to the exterior of said jacket above said shoulders.

In testimony whereof I hereby affix my signature.

WILLIAM H. SIEVERS.